(12) United States Patent
Swanson

(10) Patent No.: US 11,348,094 B2
(45) Date of Patent: May 31, 2022

(54) CONNECTING PEOPLE WITHIN PHYSICAL SPACES

(71) Applicant: Bonder, Inc., San Jose, CA (US)

(72) Inventor: Scott Swanson, San Jose, CA (US)

(73) Assignee: Bonder, Inc., San Jose, CA (US)

( * ) Notice: Subject to any disclaimer, the term of this patent is extended or adjusted under 35 U.S.C. 154(b) by 71 days.

(21) Appl. No.: 16/218,983

(22) Filed: Dec. 13, 2018

(65) Prior Publication Data

US 2019/0180271 A1  Jun. 13, 2019

Related U.S. Application Data

(60) Provisional application No. 62/598,251, filed on Dec. 13, 2017.

(51) Int. Cl.
| | | |
|---|---|---|
| *G06Q 30/00* | (2012.01) | |
| *G06Q 20/34* | (2012.01) | |
| *H04L 51/226* | (2022.01) | |
| *H04L 51/04* | (2022.01) | |
| *G06Q 30/06* | (2012.01) | |
| *H04L 51/222* | (2022.01) | |

(52) U.S. Cl.
CPC ......... *G06Q 20/351* (2013.01); *G06Q 20/348* (2013.01); *G06Q 30/0643* (2013.01); *H04L 51/04* (2013.01); *H04L 51/20* (2013.01); *H04L 51/26* (2013.01)

(58) Field of Classification Search
None
See application file for complete search history.

(56) References Cited

U.S. PATENT DOCUMENTS

2013/0332308 A1* 12/2013 Linden ............... G06Q 30/0631
  705/26.7
2016/0232480 A1*  8/2016 Erez ..................... G06Q 10/087

* cited by examiner

*Primary Examiner* — Mila Airapetian
(74) *Attorney, Agent, or Firm* — Dergosits & Noah LLP; Michael E. Dergosits

(57) ABSTRACT

Facilitating conversations among people within physical spaces is described. An interaction tablet can be housed within a physical space and configured to receive profile information from mobile devices of customers. The profile information can indicate conversational topics that customers are interested in within the physical space. Similarities between conversational topics of customers can be determined and those customers can be recommended to engage in a conversation regarding that conversational topic. One customer can also be provided information regarding what another customer prefers to purchase from the physical space and, therefore, use the purchase to facilitate a conversation to create a more engaging environment within the physical space.

17 Claims, 19 Drawing Sheets

CONNECTING PEOPLE WITHIN PHYSICAL SPACES

CLAIM FOR PRIORITY

This application also claims priority to U.S. Provisional Patent Application No. 62/598,251, entitled "Connecting People Within Physical Spaces," by Swanson, and filed on Dec. 13, 2017. The content of the above-identified application is incorporated herein by reference in its entirety.

TECHNICAL FIELD

This disclosure relates to connecting people within physical spaces, and in particular facilitating conversations among people within physical spaces such as retail stores.

BACKGROUND

Some physical spaces, such as coffee shops, provide a meeting place where people can order coffee and spend time at a table. Often, coffee shops have wireless networks offering access to the Internet to encourage customers to extend their stays. This can result in some customers being repeat customers, and some of those repeat customers might overlap their stays and recognize each other. However, some of the customers might find it difficult or uncomfortable to interact with each other without knowing more about each other. Thus, the physical space might not provide much social interaction.

SUMMARY

Some of the subject matter described herein includes a method for connecting people within a retail space to engage in a conversation with each other, the method comprising: exchanging, by a processor, first text messages between a first participant and a second participant within a messaging system; determining, by the processor, that the first participant intends to provide the second participant a virtual gift card from within the messaging system; determining, by the processor, characteristics regarding the second participant; generating, by the processor, a sequence of graphical depictions of virtual gift cards that can be provided to the second participant, the sequence based on the characteristics regarding the second participant; receiving, by the processor, a selection of a first virtual gift card from the sequence of the graphical depictions of virtual gift cards; receiving, by the processor, a selection of attributes for the first virtual gift card, the selection of attributes including a monetary value of the first virtual gift card; allocating, by the processor, the first virtual gift card to the second participant; and generating, by the processor, a content item within the messaging system indicating that the first participant provided the first virtual gift card to the second participant.

Some of the subject matter described herein also includes a system comprising: a processor; and memory storing instructions that, when executed by the processor, cause the system to: exchange first text messages between a first participant and a second participant within a messaging system; determine that the first participant intends to provide the second participant a virtual gift card from within the messaging system; determine characteristics regarding the second participant; generate a sequence of graphical depictions of virtual gift cards that can be provided to the second participant, the sequence based on the characteristics regarding the second participant; receive a selection of a first virtual gift card from the sequence of the graphical depictions of virtual gift cards; receive a selection of attributes for the first virtual gift card, the selection of attributes including a monetary value of the first virtual gift card; allocate the first virtual gift card to the second participant; and generate a content item within the messaging system indicating that the first participant provided the first virtual gift card to the second participant.

Some of the subject matter described herein also includes a computer program product comprising a non-transitory computer-readable medium having computer program instructions stored therein, execution of which by one or more computing devices causes the one or more computing devices to: exchange first text messages between a first participant and a second participant within a messaging system; determine that the first participant intends to provide the second participant a virtual gift card from within the messaging system; determine characteristics regarding the second participant; generate a sequence of graphical depictions of virtual gift cards that can be provided to the second participant, the sequence based on the characteristics regarding the second participant; receive a selection of a first virtual gift card from the sequence of the graphical depictions of virtual gift cards; receive a selection of attributes for the first virtual gift card, the selection of attributes including a monetary value of the first virtual gift card; allocate the first virtual gift card to the second participant; and generate a content item within the messaging system indicating that the first participant provided the first virtual gift card to the second participant.

DETAILED DESCRIPTION

Figure 1:
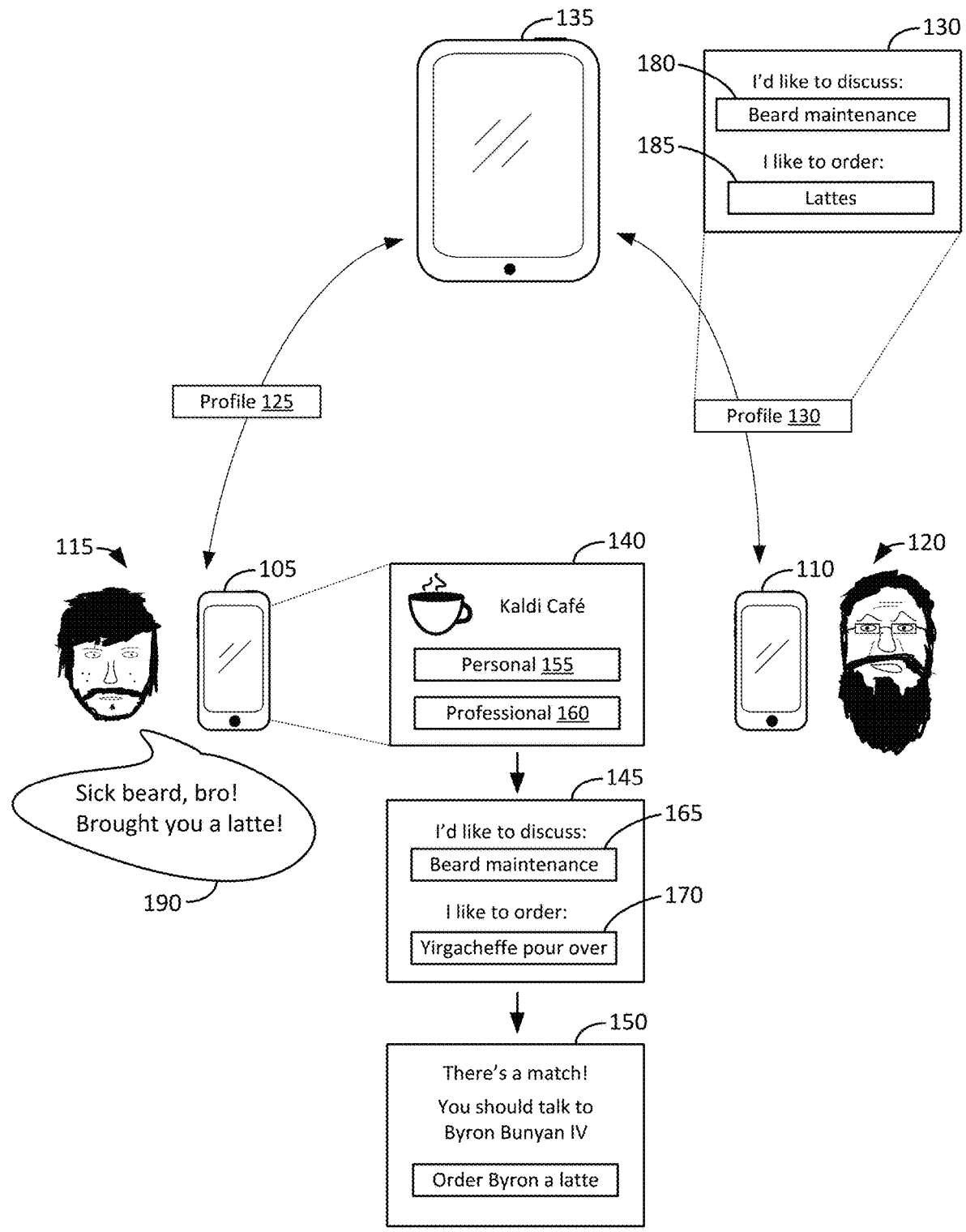
FIG. 1 illustrates an example of facilitating conversations among people within a physical space.

This disclosure describes devices and techniques for facilitating conversations among people within physical spaces. In one example, a coffee shop can provide a wireless network (e.g., implemented with one of the Institute for Electrical and Electronics Engineers (IEEE) 802.11 standards) offering access to the Internet to its customers. Thus, customers can come in, order coffee, and enjoy that coffee at one of the tables at the coffee shop while using a mobile phone (or other mobile device such as a tablet, smart watch, etc.) that has access to the Internet via the wireless network.

The customer's mobile phone can have an application installed that allows it to communicate with an interaction tablet housed within the coffee shop and also connected via the wireless network. The application on the mobile phone can generate or provide different types of a profile of the customer, for example, business or personal profiles that can indicate different topics that the customer would like to discuss and the customer's identity. Business profiles can be selected when customers are more interested in networking or professional discussions. Personal profiles can be selected when customers are interested in more social or personal types of discussions. Additionally, the profiles can indicate the type of coffee or coffee product (i.e., a product sold by the retail store such as the coffee shop) that the customer prefers. Thus, the profiles can indicate who a customer is and what they want to talk about in the moment. This profile can be received by the interaction tablet and compared with the profiles provided by other customers also having the application on their mobile phones. If the topics that the customers are interested in discussing are similar, the interaction tablet can inform the customers so that they can engage in a conversation with each other. To further facilitate the start of the conversation, the interaction tablet can also recommend one of the customers to purchase the other customer's preference for coffee.

For example, a first customer can select a business profile indicating that she would like to discuss "architecture" because she is an architect. Another, second customer can already be in the coffee shop and had previously selected a business profile indicating that he would like to discuss "architecture" also, perhaps because he is a home builder. The second customer's business profile can also indicate that he likes to order cappuccinos at the coffee shop. Thus, the first customer can be informed that there is a match for someone to discuss architecture and that customer likes to drink cappuccinos. Using the application on the smartphone, the customer can select to have an order for a cappuccino to be prepared by the coffee shop, retrieve the cappuccino, and offer it to the second customer as a way to begin a conversation regarding architecture. As a result, the customers within the coffee shop can engage with each other in a meaningful and impactful way, allowing for a visit to the coffee shop to become a more vibrant experience. Additionally, sales at the coffee shop can increase because customers can introduce one another by purchasing the other customer's preferred coffee. Moreover, customers might visit the coffee shop more often which can also lead to more sales and a more vibrant experience.

Although a coffee shop is used in the aforementioned example, other physical spaces can also be used. For example, bars, grocery stores, restaurants, conventions (e.g., trade shows, etc.), carnival grounds, circuses, concert venues, etc. can also be the physical spaces in which people can be encouraged to engage with each other using similar devices and techniques.

This disclosure also describes devices and techniques for facilitating conversations by enabling the exchange of gift cards via a messaging system of an application. In one example, an application installed on a mobile phone can be used to provide a virtual gift card from one participant of a chat to another participant of the chat. The provider of the virtual gift card can select a virtual gift card, select an amount of the virtual gift card, include a message, and then send the virtual gift card for the amount and with a message via the messaging system. The virtual gift card can then be depicted within the messaging system among the exchange of chat messages between the participants. Thus, the participants can exchange textual chat messages as well as virtual gift cards.

In more detail, FIG. 1 illustrates an example of facilitating conversations among people within a physical space. In FIG. 1, customer 115 carrying mobile device 105 might enter a coffee shop with interaction tablet 135. Mobile device 105 can include a interaction application that allows customer 115 to be connected with another customer within the coffee shop due to a shared interest in a conversational topic.

For example, the coffee shop might have a wireless network for its customers to use while enjoying their coffee products. Thus, interaction tablet 135 and mobile device 105 can be communicatively coupled with each other via the wireless network and exchange data. In FIG. 1, if it is the first time that customer 115 has entered the coffee shop with mobile device 105, and mobile device 105 has the interaction application installed, then, using the wireless network, interaction tablet 135 can be provided a message from mobile device 105 that it is in the coffee shop. Interaction tablet 135 can include or have access to a database (e.g., stored locally or on a cloud server that it has access to store information that it receives from the mobile devices. Interaction tablet 135 might include data indicating the name of the coffee shop, the menu (e.g., products or services for sale and their prices), and other information related to the business. This information can be provided to mobile device 105 and saved. Customer 115 can then be informed that a social interaction activity might be present. Thus, in FIG. 1, customer 115 can use mobile device 105, open or execute the interaction application and see graphical user interface (GUI) 140 indicating that the coffee shop (e.g., "Kaldi Café" in FIG. 1) is a place that customer 115 can be matched with another customer within the same coffee shop for a discussion. As depicted in GUI 140, customer 115 can select either a personal profile 155 or a professional profile 160.

The different profiles can indicate different motivations for customer 115 to engage in interactions. For example, by selecting personal profile 155, this might indicate that customer 115 prefers to have a more personal, less business-like interaction with another customer, for example, to discuss topics such as books, films, politics, etc. By contrast, if professional profile 160 is selected, then this might indicate that customer 115 prefers to have a more professional, business-oriented interaction with another customer, for example, to discuss job opportunities, expand his business network, etc. As a result, customer 115 can have different profiles, or "micro-profiles," representing some sort of broad intent or objective that can provide further context to a conversational topic.

In FIG. 1, customer 115 can select personal profile 155 and be presented with GUI 145, which provides an opportunity for customer 115 to indicate a topic of a conversation that he wishes to have with another customer. For example, as depicted in FIG. 1, conversational topic 165 is selected to be "Beard maintenance." Thus, this indicates that customer 115 wants to have a conversation regarding the maintenance of beards, for example, because he has questions regarding how to style his facial hair. Additionally, customer 115 can indicate his product preference 170, which can represent a product or service offered by the coffee shop that customer 115 enjoys. In FIG. 1, product preference 170 is indicate as "Yirgacheffe pour over" coffee. This profile (i.e., personal profile 155 with conversational topic 165 and product preference 170 provided) can be provided to interaction tablet 135, which can then determine whether another user with a similar profile is within the coffee shop. If so, then one or both of the customers can be recommended to meet together to interact with each other.

For example, in FIG. 1, customer 120 using mobile device 110 might have entered the coffee shop before customer 115 and provided profile 130 (also a personal profile) indicating conversational topic 180 as also being "Beard maintenance" and product preference 185 as indicating that he prefers drinking "Lattes." Interaction tablet 135 can store this information in a database and, therefore, compare the information between profile 130 and profile 125 to determine whether there are customers within the coffee shop that can be matched together for conversation.

In FIG. 1, because both customers provided personal profiles, they can be identified as potential matches. Because the personal profiles indicate the same or similar conversational topics (e.g., "Beard maintenance") then interaction tablet 135 can determine that customer 115 and customer 120 can benefit from being introduced. Thus, one or both of the customers can be provided a message by interaction tablet 135 indicating that there is another customer in the coffee shop available and interested in discussing a similar topic with some similar expectations (e.g., a casual, less formal conversation because both profiles 125 and 130 were personal profiles rather than professional profiles). In FIG. 1, because customer 120 entered the coffee shop before customer 115, customer 115 (via mobile device 105) can be provided a message depicted as GUI 150 from interaction tablet 135 indicating that theirs is someone in the coffee shop who is likely to be interested in talking.

Additionally, as depicted in GUI 150 in FIG. 1, the message received from interaction tablet 135 also indicates that customer 115 can purchase customer 120 a latte. This can be provided because it is indicated by customer 120 as his product preference 185 in profile 130. Customer 115 can select to place an order for the latte. This can provide a request back to interaction tablet 135 that customer 115 wants to order a latte, the coffee shop employees can then prepare the latte because a GUI of interaction tablet 135 can indicate to do so, and customer 115 can introduce himself to customer 120 and provide customer 120 his favorite drink as a start to a conversation 190 regarding their beards.

As a result, customer 115 can connect with customer 120 and have a meaningful conversation 190 within the coffee shop rather than sit alone at their respective tables. Additionally, the conversation can start more naturally with less or no awkwardness because the customers know a little bit more about each other, what they want to discuss, and that they're at the coffee shop for similar reasons (e.g., a personal visit rather than a professional visit for example during a coffee break from work). Moreover, the coffee shop can see more traffic (i.e., more customers) because it can be a more social gathering place, also resulting in an increase in sales.

Figure 2:
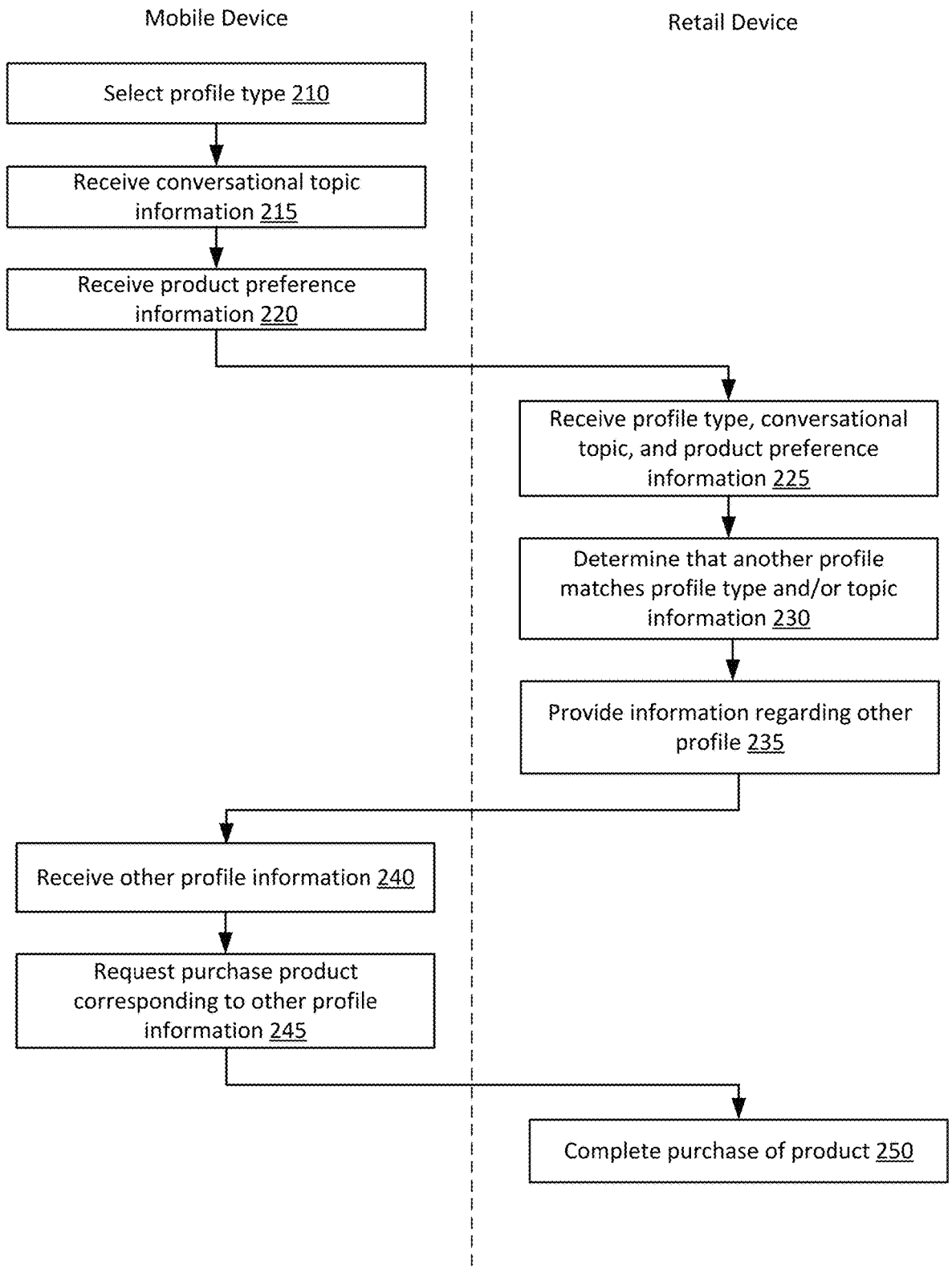
FIG. 2 illustrates an example of a block diagram for facilitating conversations among people within a physical space.

FIG. 2 illustrates an example of a block diagram for facilitating conversations among people within a physical space. In some implementations, a mobile device can connect to a wireless network of a retail space. For example, in FIG. 1, mobile device 105 can connect to the wireless network of a coffee shop in which interaction tablet 135 is also communicatively coupled with. In some implementations, this results in mobile device 105 and interaction table 135 communicating with each other and exchanging various types of data, for example, interaction tablet 135 can provide information such as the name of the coffee shop, a graphical logo, types of products or services it offers and their corresponding prices, etc. However, in other implementations, the mobile device does not have to communicatively connect with the wireless network of the coffee shop. Rather, global position satellite (GPS) location information can be provided via any other communicative means via and with an application program interface (API) access a server to implement the functionalities described herein.

The mobile device can then use an interaction application configured to interact with interaction tablet 135 to select a profile type (210). For example, in FIG. 1, customer 115 can use mobile device 105 to select personal profile 155 using GUI 140. This results in the interaction application indicating that customer 115 wants to use a personal profile as opposed to a professional or business profile. As discussed herein, customer 115 might want to have different profiles based on the types of interactions that he wants. In one scenario, during business hours on weekdays, he might prefer to use his professional profile. Outside of business hours on weekdays and all weekend, he might prefer to use his personal profile.

The mobile device can then receive conversational topic information (215) and product preference information (220). In some implementations, a name of the customer can also be received. For example, in FIG. 1, customer 115 can input that he would like to discuss "Beard maintenance" regarding his facial hair as conversational topic 165 and that he likes to order "Yirgacheffe pour over" to indicate that he likes to drink a pour over style coffee made from beans harvested from the Yirgachefe district of Ethiopia. In some implementations, a customer can provide many different conversational topics. For example, several keywords can be individually or collectively provided regarding a single topic or multiple topics that the customer is interested in having.

Next, the profile can be provided to the interaction tablet so that it can receive the profile type, conversational topic, and product preference (225). For example, in FIG. 1, interaction tablet 135 can receive profile 125 indicating that it is a personal profile 155 providing conversational topic 165 and product preference 170. Using that information, it can be determined that another profile matches or is similar (230). For example, in FIG. 1, interaction tablet might have been previously provided profile 130 from mobile device of another customer 120. The information of profiles 125 and 130 can be analyzed and determined whether customer 115 and customer 120 should be recommended to engage in a conversation in the coffee shop. For example, similarities between the profile type, and conversational topic can be determined. In some implementations, merely similarities between the conversational topics can be determined without consideration of profile type. Though the conversational topics are identical in FIG. 1, in other implementations, similarities between them can be determined for matching purposes. For example, one customer might input in "Beards" while another customer might put in "Facial hair" and these can be determined by interaction tablet 135, or a cloud server that interaction tablet 135 has access with, to be associated with a similar conversational topic. Thus, textual recognition can be performed by interaction tablet 135 to determine whether text from different profiles is the same, similar, or related to each other. In some implementations, this functionality might be performed by the mobile device. For example, the profiles of other customers within the store can be provided to a customer's mobile device and the mobile device can make similar determinations as interaction tablet 135.

If another customer has a profile that can be determined as belonging to someone that should be introduced, then information regarding the other profile can be provided (235) to the mobile device (240). For example, in FIG. 1, information from profile 130 can be provided to mobile device 105 used by customer 115. As depicted in GUI 150, this can include the name of customer 120 (e.g., "Byron Bunyan IV") and an indication that customer 115 can purchase a product or service for customer 120. In FIG. 1, because interaction tablet 135 is in a coffee shop, customer 115 can order a "latte" as indicated in GUI 150 for customer 120. This information (i.e., the particular object or service that can be purchased for the other customer) can also be received from profile 130. In some implementations, the information can also include location information for a customer within the retail space. For example, in FIG. 1, the location of customer 120 within the coffee shop can be provided to customer 115. The location can be a table number, a description of where customer 120 is within the store (e.g., the table in the corner), etc.

A request to purchase the product corresponding to the other profile information can be provided (245) and the purchase of the product can be completed (250). For example, if customer 115 selects that he wants to order a "latte" for customer 120 because that is what customer 120 prefers from that location, a message can be provided to interaction tablet 135. Interaction tablet 135 can then display a message available to a barista, input in an order into an existing ordering system, etc. such that the product can be prepared. Customer 115 can then pick up the item, bring it over to the table of customer 120, and offer it as an introduction to a discussion regarding maintaining their beards (or other conversational topics).

Figure 5:
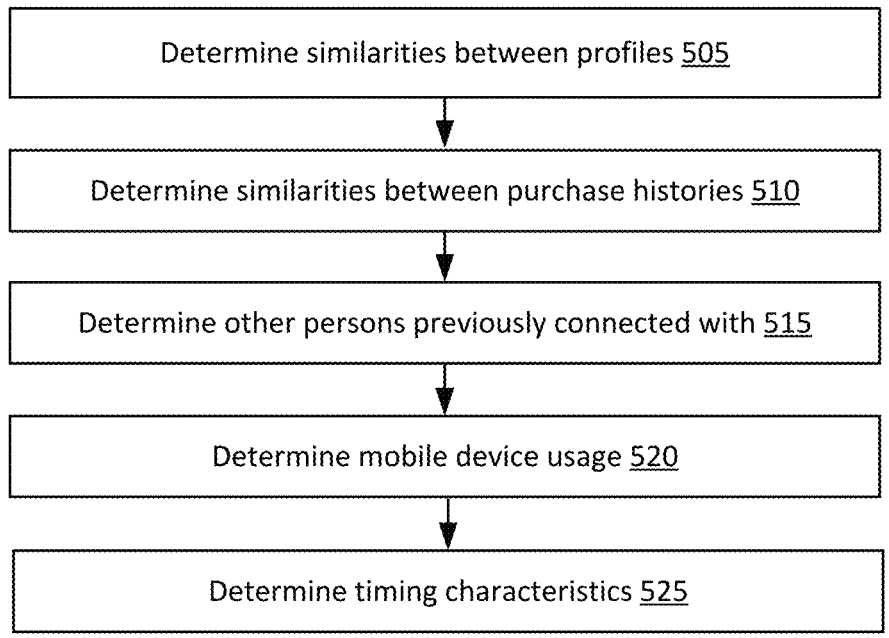
FIG. 5 illustrates an example of a block diagram for determining a match.

More information than analyzing the profiles can be used determine whether customers can be recommended to converse with each other. FIG. 5 illustrates an example of a block diagram for determining a match. In FIG. 5, similarities between the profiles can be determined (505). For example, as previously discussed, similarities between the conversational topics, profile types, even type of product preference can be determined.

Similarities between purchase histories can also be determined (510). For example, if customers often purchase the same products (e.g., X amount of times in the last Y days, the same product is purchased at least 75% of the time, etc.) from the retail store, then this can be considered when recommending customers to interact with each other. This might be done because customers might indicate similar product preferences and discussing the product can also be an introduction to a more meaningful and engaging conversation.

The persons that customers have previously connected with can also be determined (515). For example, interaction tablet 135 can store records (or it can store the records in a cloud server that it can access) indicating who customers within the store have previously interacted with. If customer 115 in and customer 120 in FIG. 1 have both previously interacted with another customer at different times, then this can be considered when matching customers. This might be done because it provides more similarities into customers and customers who interact with common other customers might have more engaging conversations themselves. As a result, conversational histories with other customers within the same physical space (e.g., within the same coffee shop) can be determined by interaction tablet 135, and similarities between conversational histories of customer 115 and customer 120 can be determined (e.g., determine that they both have had conversations with X number of the same other customers within the coffee shop). Customers 115 and 120 can then be recommended to engage with each other.

Mobile device usage can also be determined (520). For example, the interaction application can determine how the mobile device of a customer is being used. If one customer tends to browse the Internet for a significant amount of time while another customer tends to not use his mobile device in the coffee shop, then the customer who tends to not use the mobile device within the coffee shop might be selected to have a conversation with because he or she might be more open to having a conversation because they are not preoccupied with their mobile device. In some implementations, the person using the mobile device might be selected to facilitate their interactions to the social meeting place of the coffee shop. Thus, the activities of the customers using their mobile phones can be determined and used to make the determinations herein.

Timing characteristics can also be determined (525). For example, customer 115 can be at the coffee shop at 1:00 PM and two other customers can also be there at the same time. However, one of those other customers might have a history of usually visiting the store at other times (e.g., as determined by purchases by that customer, determinations that the customer is within the store based on the interactions between the interaction application of the mobile device and the interaction tablet 135, etc.). For example, perhaps 75% of the time, customer A visits the coffee shop between 12:50 PM to 1:15 PM. However, another customer B tends to visit the coffee shop between 11:00 AM to 11:30 AM around 80% of the time. Thus, customer B might usually not be available for customer 115 to connect with because he enjoys going to the coffee shop at 1:00 PM. Thus, customer B might be selected in part of this determination over customer A because customer A can be selected later because he is more of a regular during the same time around 1:00 PM. As a result, the potential number of new people for customer 110 can meet over time can be increased.

Customers having conversations with other customers can also review each other and these reviews can be determined to recommend conversations. For example, customers can provide textual reviews (e.g., summarizing their experience with the other customer), provide a rating (e.g., 4 out of 5 stars), etc. Thus, the conversations or encounters with other customers that were recommended can be reviewed. The reviews of customers can then be used to make the determinations as discussed herein.

Figure 3:
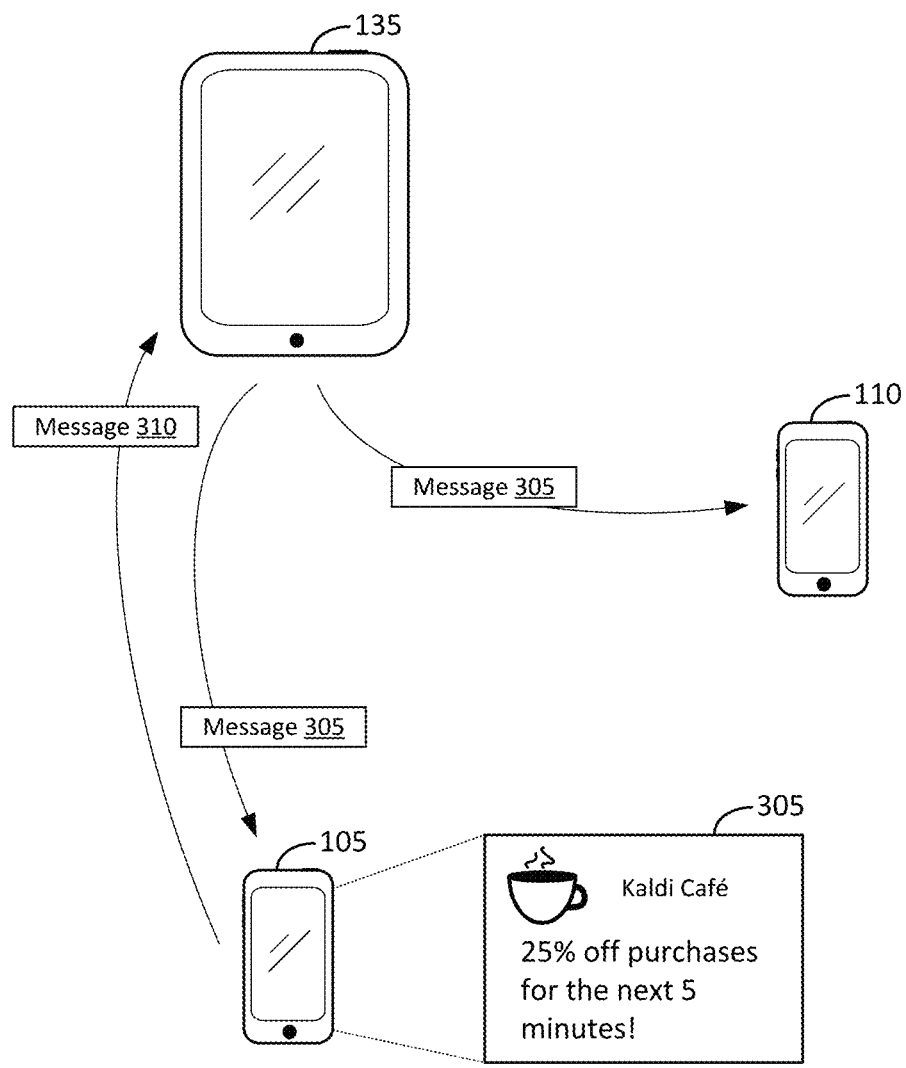
FIG. 3 illustrates an example of providing a message regarding a promotion within a physical space.

Because mobile devices can have the interaction application installed to communicate with interaction tablet 135, additional features can be brought into physical spaces such as retail stores. FIG. 3 illustrates an example of providing a message regarding a promotion within a physical space. In FIG. 3, interaction tablet 135 can be used to provide individual discounts for products or services to particular customers within the store, or even blanket discounts to all or groups of several customers within the store. For example, because the interaction applications of the mobile devices interact with interaction tablet 135, it can be determined whether a particular customer is within the store. A GUI displayed on a display screen of interaction tablet 135 can provide a representation, for example a list, of the customers in the store who have the interaction application installed. Thus, these customers can be targeted to receive a message providing information regarding a promotion within the store. The customers can then engage with the promotion (e.g., purchase a cup of coffee at a 25% discount) by indicating so in the interaction application, resulting in interaction tablet 135 receiving that indication so that an employee can carry out the purchase (e.g., make a cup of coffee, etc.).

For example, in FIG. 1, interaction tablet 135 can provide messages 305 to mobile devices 105 and 110 indicating that purchases for the next five minutes are 25% off. Mobile devices 105 and 110 can be targeted because they have the interaction application installed and they are connected to the wireless network so that they are in communication with interaction tablet 135.

In some implementations, customers who have recently engaged in a conversation using the techniques described herein and are still within the store can be identified as customers to provide message 305. For example, if one customer purchased the product preference of another customer that they were recommended to engage with in a conversation, then this can indicate that those two customers are having a conversation regarding the conversational topic in their profiles. Thus, customers can be rewarded for socializing within the store and, therefore, creating a lively environment where people would enjoy spending time. In some implementations, the product indicated as being offered at a promotional discount can be the product of customer 115 in FIG. 1 who purchased the product corresponding to the product preference of customer 120. That is, if customer 115 purchases the product that customer 120 enjoys to being a conversation, the promotional discount can reflect a promotion regarding product preference 170 of customer 115. Thus, customer 115 can receive a discount for something that he enjoys after purchasing a product for customer 120 to begin the conversation. This might extend the conversation and contribute to a more social environment with the shop.

In some implementations, customers within the store who are using a certain type of profile can be identified as customers to receive message 305. For example, customers who are visiting for personal reasons (i.e., using a personal profile) can be provided message 305 while customers who are currently using the professional profile may not receive message 305. In some implementations, customers can receive message 305 based on other information related to their profiles disclosed herein, for example, based on their indicated product preference.

In some implementations, customers can be provided messages upon entering the store. For example, when the customer's mobile device is communicatively coupled with the interaction tablet 135 via the wireless network, the mobile device can be detected and, therefore, the customer can be determined to have entered the store. The customer can then be provided a message regarding a promotion. Additionally, because the wireless network often has a range beyond the physical boundary of the store, even passing customers or potential customers can be provided a message to encourage them to enter the store. In some implementations, interaction tablet 135 can store or access purchase information of customers and then provide a message regarding a purchase based on the customer's purchase history at the store. For example, if the last purchase of the customer is determined to be a latte at a coffee shop, then when the customer is determined to have entered, they can be provided a message offering them the opportunity to order the latte because it was the last item they purchased. The customer can then select to have the latte ordered in a similar manner as disclosed elsewhere herein.

In another implementation, the customer can be provided a message indicating that they can order a product or service via their mobile device using the interaction application. The customer can provide order details (e.g., the item they wish to purchase), can be provided information regarding a discount, etc. and then they can receive a confirmation when their order is ready for pick up.

In FIG. 1, this results in mobile device 105 receiving message 305. If the customer using mobile device 105 wants to engage in the promotion, they can indicate so (e.g., selecting a button, hyperlink, etc. provided by a GUI displaying message 305) and this information can be provided back to interaction tablet 135 can they can process the order. Thus, interaction tablet 135 can provide an easy and targeted way to offer discounts depending on the time of day, lull in sales, etc.

Figure 4:
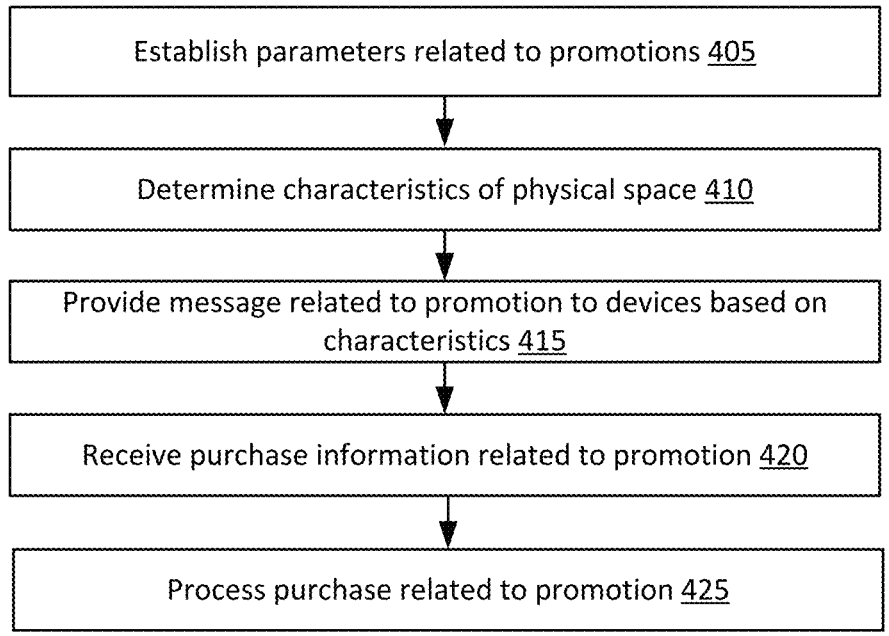
FIG. 4 illustrates an example of a block diagram for providing a message regarding a promotion within a physical space.

FIG. 4 illustrates an example of a block diagram for providing a message regarding a promotion within a physical space. In FIG. 4, parameters related to promotions can be established (405). For example, in FIG. 3, a store employee can utilize interaction tablet 135 to establish when to send out messages regarding promotions (e.g., when sales drop below a certain monetary amount (under $1000) in a particular time period (e.g., 1 hour), when the number of customers detected within the store using the interaction application is within some range (e.g., less than 10 customers), when a certain number of customers have used the interaction application to engage in conversations (e.g., 5 groups of conversations currently engaged within the store), etc.). In another example, when a new customer is determined to have entered the store can be a parameter. Eventually, characteristics of the physical space can be determined (410). For example, any of the aforementioned conditions can be determined to have been met. In some implementations, an employee of the store can manually select to send a promotion.

A message related to the promotion can then be provided to the devices based on the determined characteristics (415). For example, in FIG. 3, message 305 can be provided by interaction tablet 135 to mobile devices 105 and 110 upon the determination of the characteristics of the environment of the retail store. Thus, customers can receive information indicating that they are being offered a promotion related to the products or services of the store. Using the interaction application, the customers can indicate that they want to engage with the promotion. Thus, purchase information regarding the promotion can be received (420). As a result, interactive tablet 135 can then process the purchases (425). For example, it can indicate to an employee that he or she needs to prepare the products related to the promotion.

Interaction tablet 135 can also enable additional features within the physical spaces it is placed within. For example, a customer can be able to "gift" a purchase to another customer within the store. A customer can use his or her interaction application, which can interface with interaction tablet 135 to receive data indicating other customers within the store and purchase that customer a product. For example, the profiles of other customers that they have activated using the interaction application can be listed and viewed for additional insight into that customer. That customer can then receive a message indicating who purchased the product and that the product is available or has been purchased for them.

In some implementations, gift cards (e.g., offering credit towards purchases at stores, such as $10 towards purchases at a coffee shop) can be gifted to another customer. For example, one way to promote interactions between customers can include one customer offering a gift card to another customer in the physical space. For example, one customer can be in a coffee shop and review the profiles (e.g., business or social profiles as previously discussed) and want to talk to another customer having an interesting profile. To make an initial introduction, the first customer can provide the other customer a message indicating that the first customer is interested in talking. The first customer can also include a custom message (e.g., indicating why there is an interest in talking, for example, talk about a business opportunity related to the business profile of the other customer) and also offer a gift card to facilitate the introduction.

The other customer can then view and read the message provided by the first customer. The other customer can then accept or decline the introduction request. If accepted, then the gift card can be gifted to the other customer. That is, the other customer can receive the value of the gift card. The two customers can then engage in a conversation.

The gift card can be for the business at the same physical location that the customers are currently in, or can be for another business. In some implementations, interaction tablet 135 or mobile device 105 can determine that the customers are in the same location (e.g., the same coffee shop) and that coffee shop includes interaction tablet 135 and allows customers to make purchases with gift cards. Thus, when wanting to send an introduction to another customer, these conditions can be determined and the offer of a gift card can be provided as an option.

In other implementations, when customers are not within a location with interaction tablet 135, a gift card that can be used in multiple other locations can be provided as an option. In other implementations, customers can select a location to offer a gift card for to another customer for the initial introduction. For example, the customers can be in a coffee shop, but a gift card to a bookstore can be offered.

In some implementations, the customers can offer a charitable donation instead or in addition to a gift card. For example, the first customer can offer to make a $5 donation to a charity or non-profit organization such as the Sierra Club if the other customer agrees to meet for a conversation. In another implementation, if the other customer receives a gift card, that other customer can choose to have the monetary value of the gift card donated to a charity. In some implementations, customers can donate the monetary value of the gift card and the donations of multiple customers can be aggregated together into a "charity bucket." The aggregated donations in the charity bucket can then be donated together to a particular cause. Thus, customers can collectively donate to a larger donation.

In some implementations, the customer can specify how the other customer being provided the gift card can spend that gift card. For example, the gift card can be limited to a particular location (e.g., one coffee shop at a specific location rather than other coffee shops at other locations that are part of the same chain), limited to certain items (e.g., beverages but not food), limit to time (e.g., can be spent in a time range such as the day time but not in the evenings), etc.

In some implementations, the customer wanting to initiate a conversation with another customer can be provided a recommendation of providing an item (e.g., a product sold by the retail store such as a cup of coffee sold by the coffee shop) or providing a gift card. The customer can then select which of the two to provide the other customer, or even provide both to the other customer. Additionally, interaction tablet 135 or mobile device 105 can provide a recommendation based on a variety of factors. For example, the type of profile (e.g., personal or business) of the other customer can be determined, and different profile types can result in different recommendations. For example, a customer using a business profile can result in a recommendation of providing an item sold by the shop, but if the customer is using a personal profile then this can result in a recommendation of providing a gift card.

Characteristics of the store can also be considered. For example, if the location of the store is in a high-density area (e.g., a downtown core) then perhaps an item can be recommended, but if the store is in a low-density area (e.g., a suburb) then a gift card can be recommended. Other characteristics can include the time of the proposed conversation. In some implementations, more conversations might be initiated using one of the options. For example, in a coffee shop, it can be determined by interaction tablet 135 or mobile device 105 that more conversations are agreed upon if a product from the coffee shop (e.g., cup of coffee, a muffin, etc.) are offered rather than a gift card. To improve the likelihood of conversation and social engagement, the product can be recommended to be provided instead of a gift card, or vice versa.

Characteristics of either customer's mobile devices can also be considered. For example, if a mobile device of the other customer is determined to have a low battery (e.g., determined by interaction tablet 135 or mobile device 105), then one of the recommendations can be provided. For example, the first customer can be recommended to offer an item from the store rather than a gift card because the other customer would not have to use their mobile device to claim the gift card. Rather, the barista or clerk can provide the gifted item. Similar recommendations can be performed using other characteristics of mobile devices such as wireless strength (e.g., how strong the wireless network is perceived from the mobile device). These examples include the offeree's mobile device characteristics, but characteristics of the offeror can also be considered in similar ways.

In some implementations, the amount of the monetary value of the gift card can also be recommended. For example, based on the type of location, type of profile, time, or other variables or characteristics described herein can be used to determine an amount of the gift card that can be recommended. For example, gift cards for business profiles can have recommended values that are higher than gift cards for customers using social profiles.

In some implementations, customers can provide their credit card information, gift card information, loyalty card information, or other forms of payments to facilitate the purchases described herein.

In some implementations, customers can use both personal and business profiles at the same time. For example, in FIG. 1, customer 115 can enable both personal profile 155 and professional profile 160. The different profiles can indicate different information (e.g., different conversational topics).

In some implementations, more than two customers can be recommended to have a conversation. For example, three different customers might have similarities in their information (e.g., from their profiles) in a way that they might have a meaningful group conversation. Thus, in some implementations, customers can indicate a maximum, minimum, or a range of customers to be included in a potential conversation within the coffee shop. In some implementations, to encourage such lively conversations, the retail space might offer a higher promotional discount than if customers are engaged in two-customer conversations or are by themselves. In some implementations, interaction tablet 135 does not recommend conversations, rather, the customers can use the interaction application (and any functionality related to interaction tablet 135) to explore other customers within the area to be aware of each other and then connect as they wish.

In some implementations, interaction tablet 135 is not included. For example, two different people with the interaction application installed upon their mobile devices might be walking on the same street. The interaction application can use cellular communications, global positioning satellite (GPS) systems, etc. to determine that the users are within close proximity and then recommend conversations as disclosed herein. Thus, one smartphone or other portable electronic device can communicate with another without interaction tablet 135. In some implementations, one user can be provided an alert that another user is within close proximity based on geo-location information. As a result, users can be alerted to engage in an interaction. In another example, the functionalities described regarding the interaction tablet can be implemented by a server. For example, the smartphones might communicate with a server to implement some of the functionalities described herein.

Figure 7:
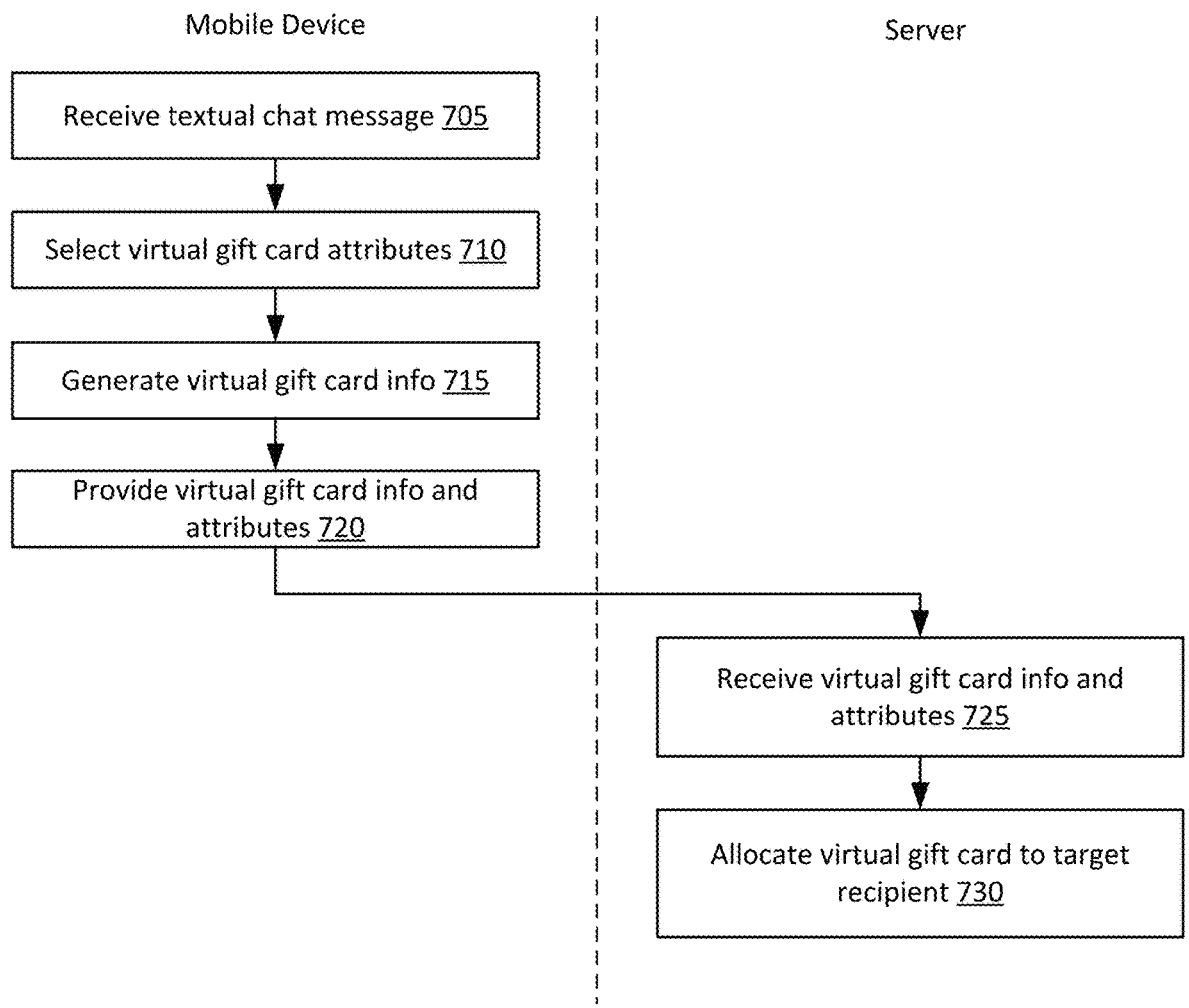
FIG. 7 illustrates a block diagram for exchanging a virtual gift card.
Figure 8:
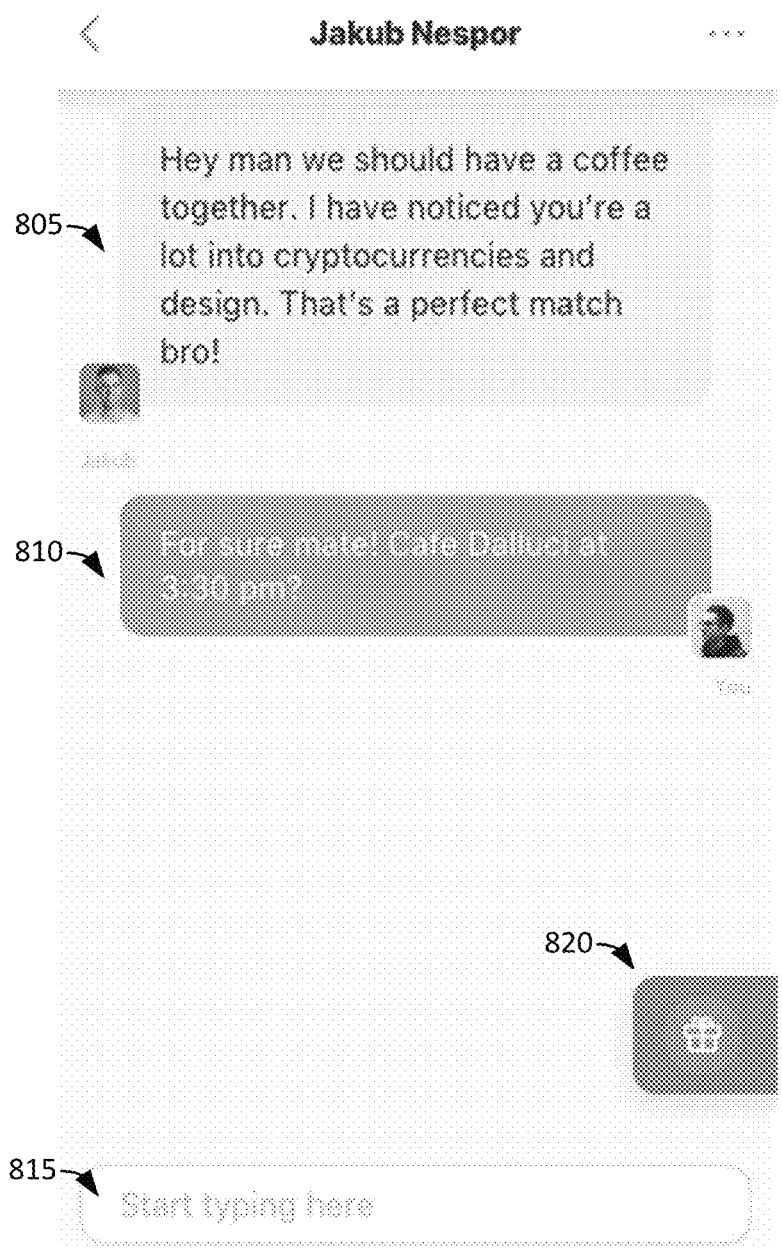
FIGS. 8-19 illustrate examples for exchanging a virtual gift card.

FIG. 7 illustrates a block diagram for exchanging a virtual gift card. In FIG. 7, a textual chat message can be received (705) or provided. For example, in FIG. 8, two users of an application (e.g., installed on two separate smartphones) can exchange textual messages using a messaging system of the application. In FIG. 8, this results in exchange of messages 805 and 810 between two different participants via textual input 815. As depicted in FIG. 8, one participant can request a meeting for coffee to discuss a topic via message 805. The second participant can confirm to meet up via message 810. Thus, using the techniques disclosed herein, two people can facilitate a meeting in the physical world using an application.

To thank the second participant to agree to the meeting, or for a variety of other social reasons, the first participant (or the second) can then provide the other with a virtual gift card using virtual gift card ribbon 820. Virtual gift card ribbon 820 can be a selectable graphical user interface (GUI) element that can be used to enable an option to provide a gift card to a participant within the messaging system. In some implementations, virtual gift ribbon 820 can be persistently shown (e.g., always appear at the bottom of the messaging system). However, in other implementations, virtual gift ribbon 820 can disappear while text is being input in textual input 815 and reappear when textual input 815 is no longer being used. In another implementation, the content of messages 805 and 810 can be analyzed and based on the content, virtual gift ribbon 820 can be generated to appear. For example, if a question is asked in a first message (from a first participant) and an answer to that question is provided via a second message (from a second participant), then virtual gift ribbon 820 can be generated to encourage the first participant to reward the second participant. Other characteristics of the messages as well as the overall conversation can be determined and used to generate virtual gift ribbon 820. For example, the number of messages exchanged, the number of messages exchanged within a certain time period, whether the second participant quickly provided a response, etc. can also be determined and used to generate virtual gift ribbon 820 to encourage the giving of a virtual gift card. Any of the characteristics descried herein can be used to determine the sequence of virtual gift cards or attributes as described herein.

Figure 9:

Upon selecting virtual gift ribbon 820, virtual gift card attributes can be selected (710). For example, in FIG. 9, the merchant in which the virtual gift card is for, or the merchant that can be used to spend the virtual gift card, can be selected via a visual representation. As depicted in FIG. 9, gift cards 905, 910, and 915 can be vertically scrolled through and the intended gift card can be selected.

In some implementations, the gift cards can be arranged and scrolled through in an order based on a variety of characteristics of the sender of the gift card or the recipient of the gift card. For example, geo-location information of the sender or the recipient can be determined and the gift cards can be in an order such that a store (for in which a gift card can be spent) closest to the recipient can be displayed first. The second closest store can be displayed second, and so forth such that the cards are stored in a descending, sequential order from the recipient to the nearest location of that store. In another example, characteristics of the recipient's smartphone can be determined and used, such as the recipient's smartphone battery level. In this example, if the smartphone battery level is below a threshold percentage, or within a threshold range, then gift cards at places where the smartphone can be charged can be displayed more prominently (e.g., coffee shops displayed in the sequence first before a restaurant). In some implementations, the sender of the virtual gift card can also be provided a notification that the cards are in the particular sequence based on what the application believes would be most useful due to any of the aforementioned characteristics. Thus, the sender can select a gift card that would be more useful to the recipient. This can also allow for a more efficient virtual gift card giving experience via a GUI for the sender. Additionally, this can allow for the sender to quickly provide a gift card, which can result in using less battery of the sender's smartphone.

In another example, the characteristics of the text messages can be used generate the sequence. For example, the content of the text messages can be analyzed and if the topic is similar to what a merchant sells, then a virtual gift card for that merchant can be prioritized in the sequence earlier than other merchants.

Though the above examples describe a vertical list or sequence of gift cards, other visualizations can be provided. For example, one larger gift card can be displayed at the top and smaller graphical depictions of gift cards can be displayed in a grid. Thus, a gift card that might be most useful can be more prioritized and easily seen due to being a larger size than other gift cards.

Additional attributes for the virtual gift card can include a monetary sum for the virtual gift card. For example, in FIG. 10, a range of monetary values can be selected via monetary selection 1005. Depicted in FIG. 10, examples can include $5, $10, or $15 values, but these values can be different. Moreover, a custom value can be input by the giver, for example, via a slider, input box, etc.

In some implementations, one of the values selected within monetary selection 1005 can be pre-selected. This can be done by analyzing any of the characteristics disclosed herein. For example, the more textual messages exchanged within the messaging system of the application between the sender and recipient of the virtual gift card can lead to a higher monetary selection being pre-selected. A fewer number of textual messages can result in a lower monetary selection being pre-selected. In some implementations, the default values provided via monetary selection 1005 can be different based on the characteristics. Thus, a lowest, middle, or highest number within monetary selection 1005 can be different based on different situations or messages.

Figure 10:
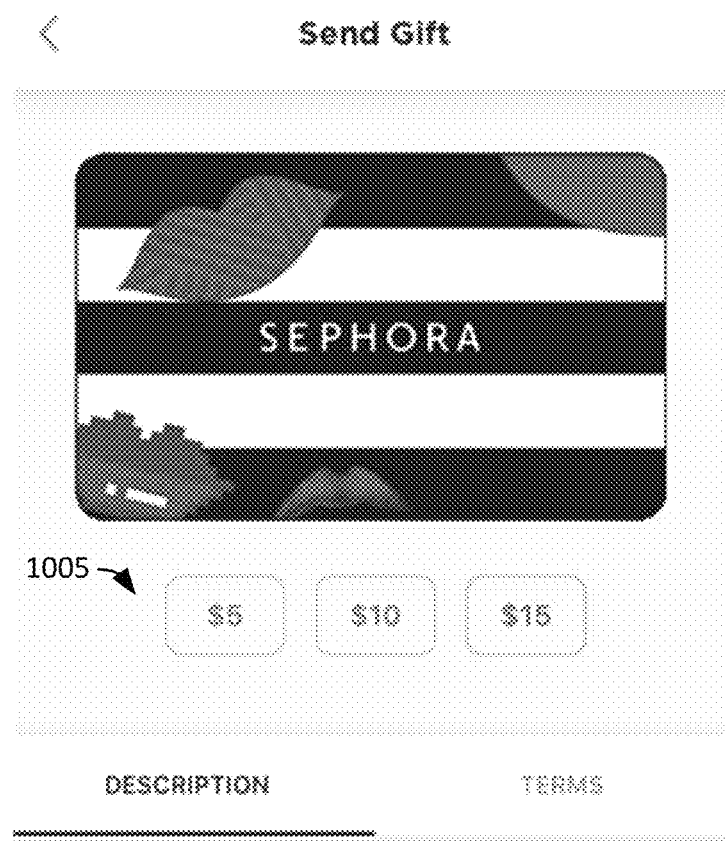

As depicted in FIG. 10, additional information, such as a description of the merchant or the terms of the gift card (e.g., expiration date, minimum purchase, etc.) can be provided to the sender to make a more informed decision regarding which gift card to provide.

Figure 11:
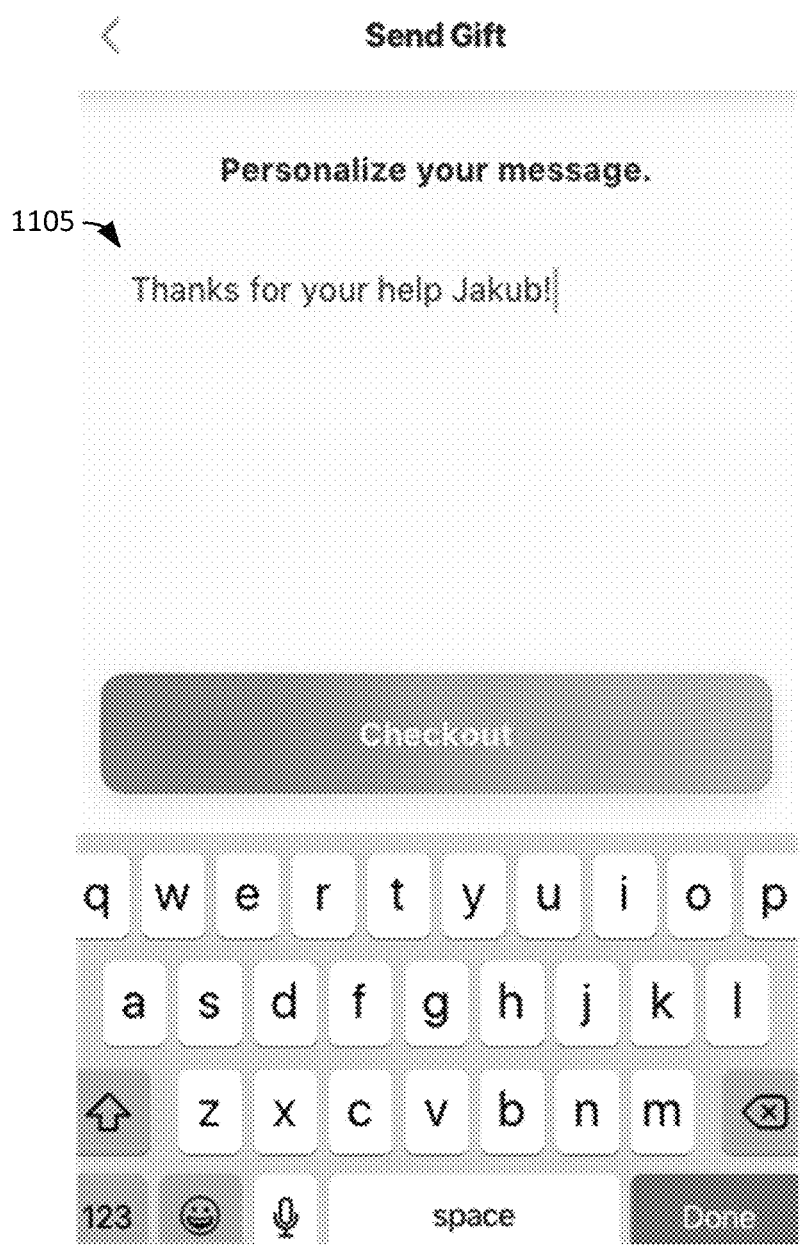
Figure 12:
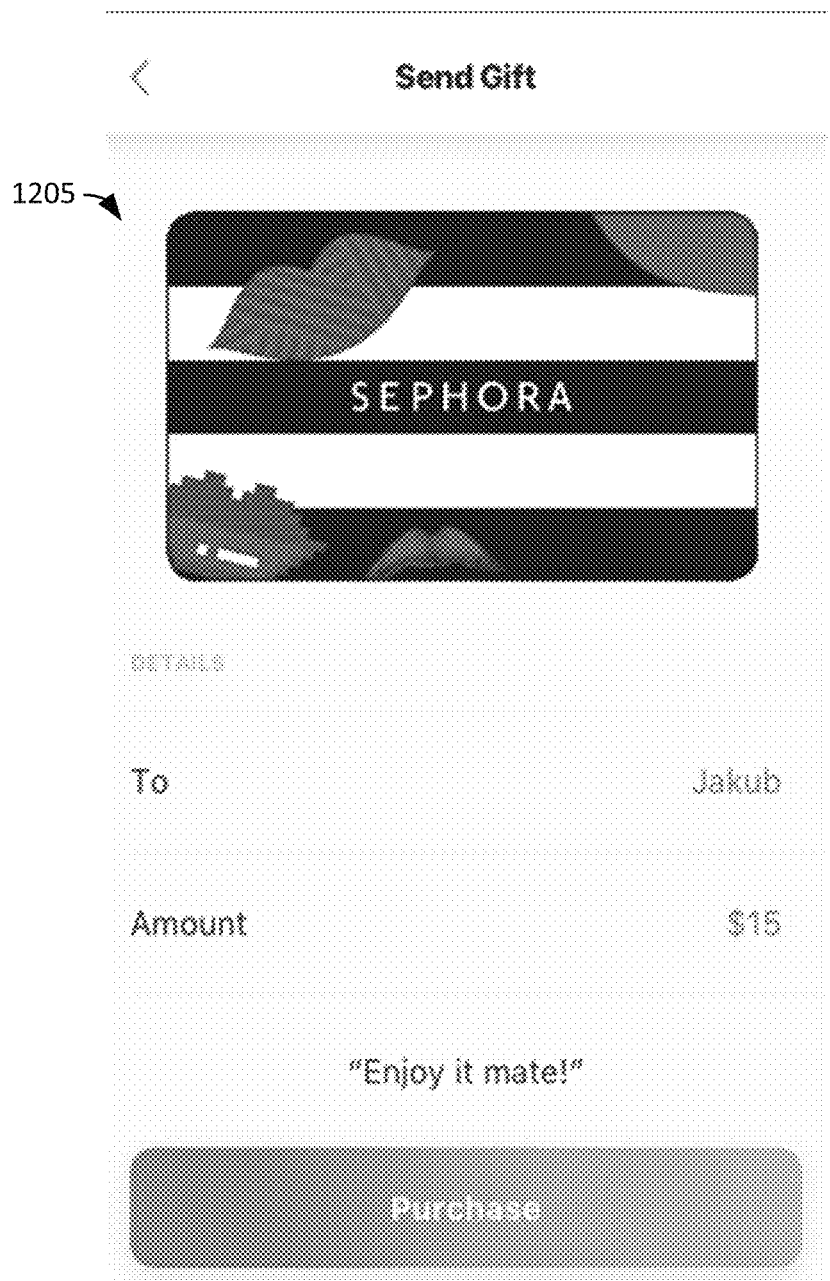

Next, information for the virtual gift card can be generated (715). For example, in FIG. 11, a message can be provided along with the virtual gift card for the recipient to read. As depicted in FIG. 11, message 1105 is a textual message input by the sender for the recipient to view in conjunction with the receiving of the virtual gift card. Upon completing of the information, in FIG. 12, a summary 1205 of the virtual gift card attributes and information including the merchant, amount, recipient name, and message can be generated and verified.

The virtual gift card information and attributes can then be provided (720). For example, the information can be sent to a server (that can manage the transactions regarding the virtual gift cards) or the recipient's smartphone application directly, or via the server to the recipient's smartphone application. The virtual gift card information and attributes can be received (725), and the virtual gift card can be allocated to the targeted recipient (730). In some implementations, this includes updating information in a database having records indicating the monetary values of the gift cards and corresponding assignments to various users (e.g., recipients) as well as any of the other information described herein.

Figure 13:
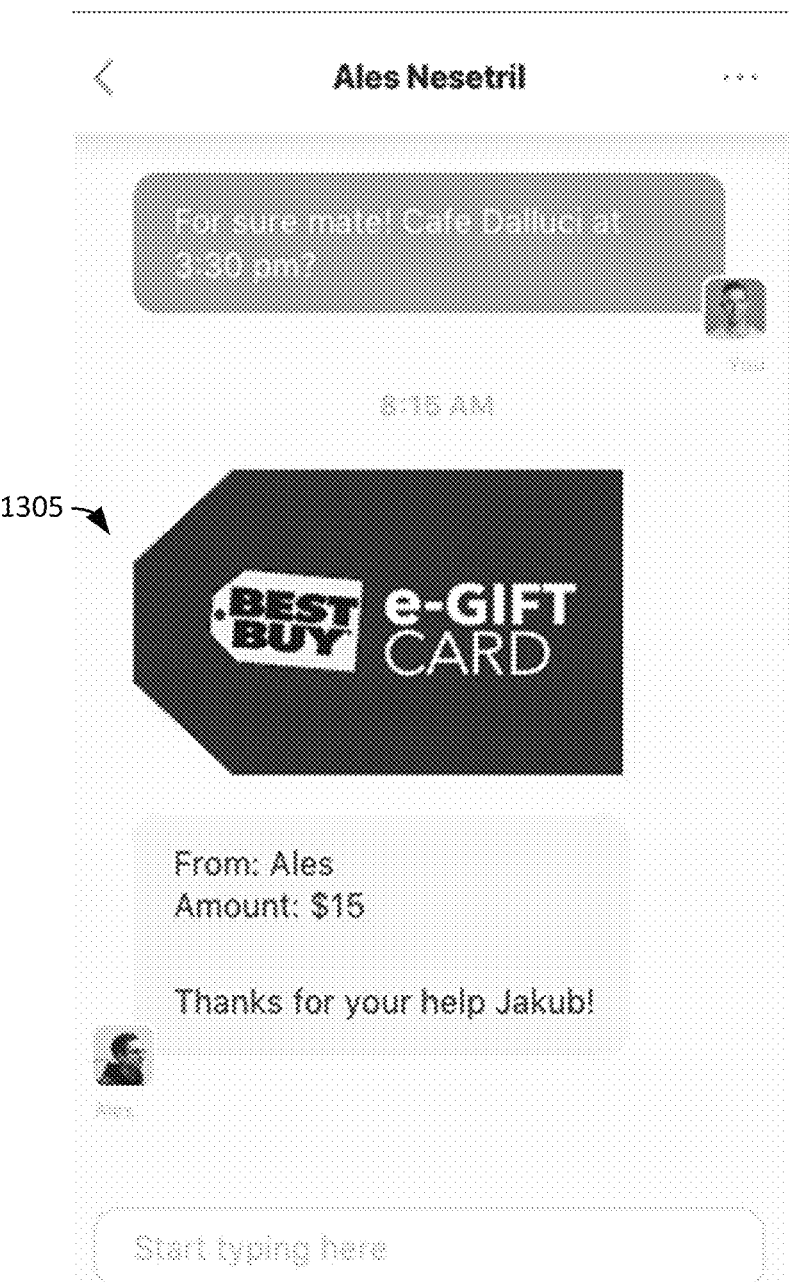

Returning to the messaging system of the application, the providing of the gift card can then be displayed with the textual messages being exchanged between the sender and the recipient. For example, in FIG. 13, both the sender and the recipient can see a new message within their messaging system providing a visual depiction of the virtual gift card attributes and information. Thus, a virtual gift card can be seamlessly integrated within a messaging system. New messages can be sent and/or received and displayed within the messaging systems. This can result in the depiction of the virtual gift card being arranged between the older messages and the new messages just as if it was another message.

Figure 14:
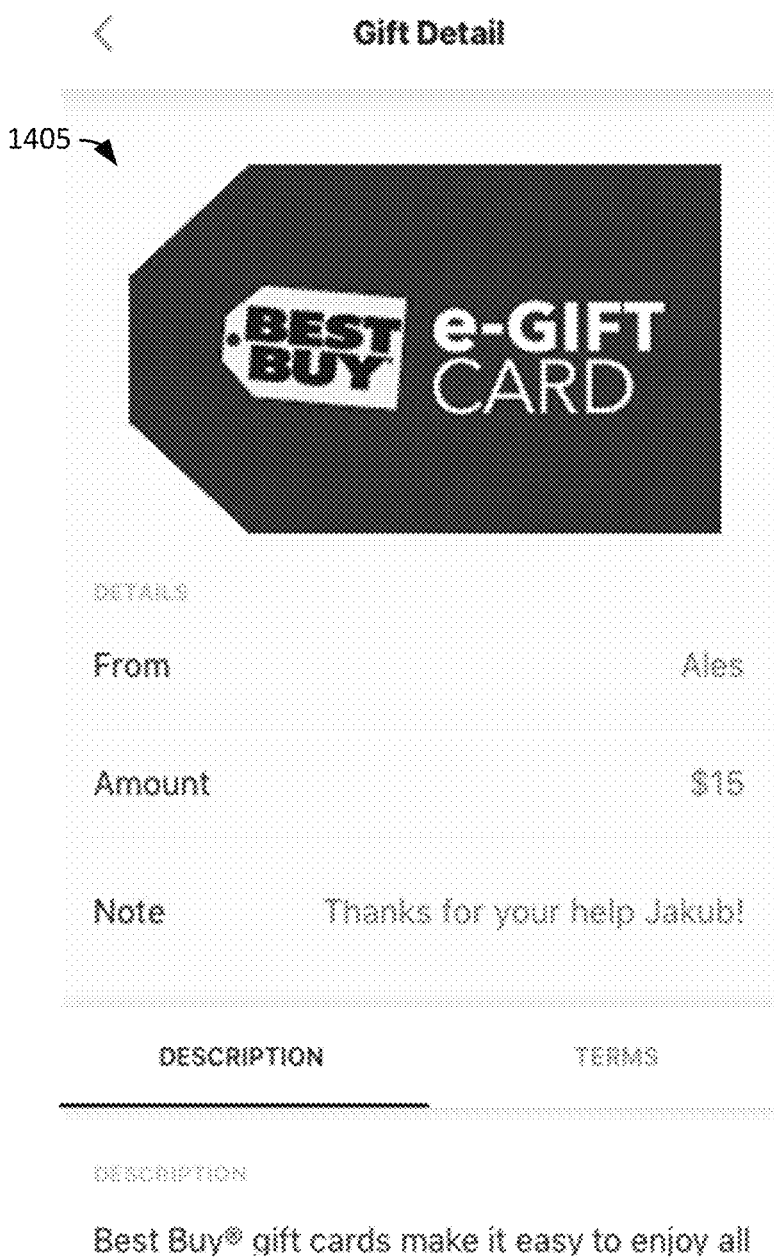

As depicted in FIG. 14, either the sender or recipient can select the graphical display of the virtual gift card within the messaging system can view details regarding it. For example, in FIG. 14, the attributes and information of the virtual gift card can be viewed, along with the description regarding the merchant and the terms for the virtual gift card.

Figure 15:
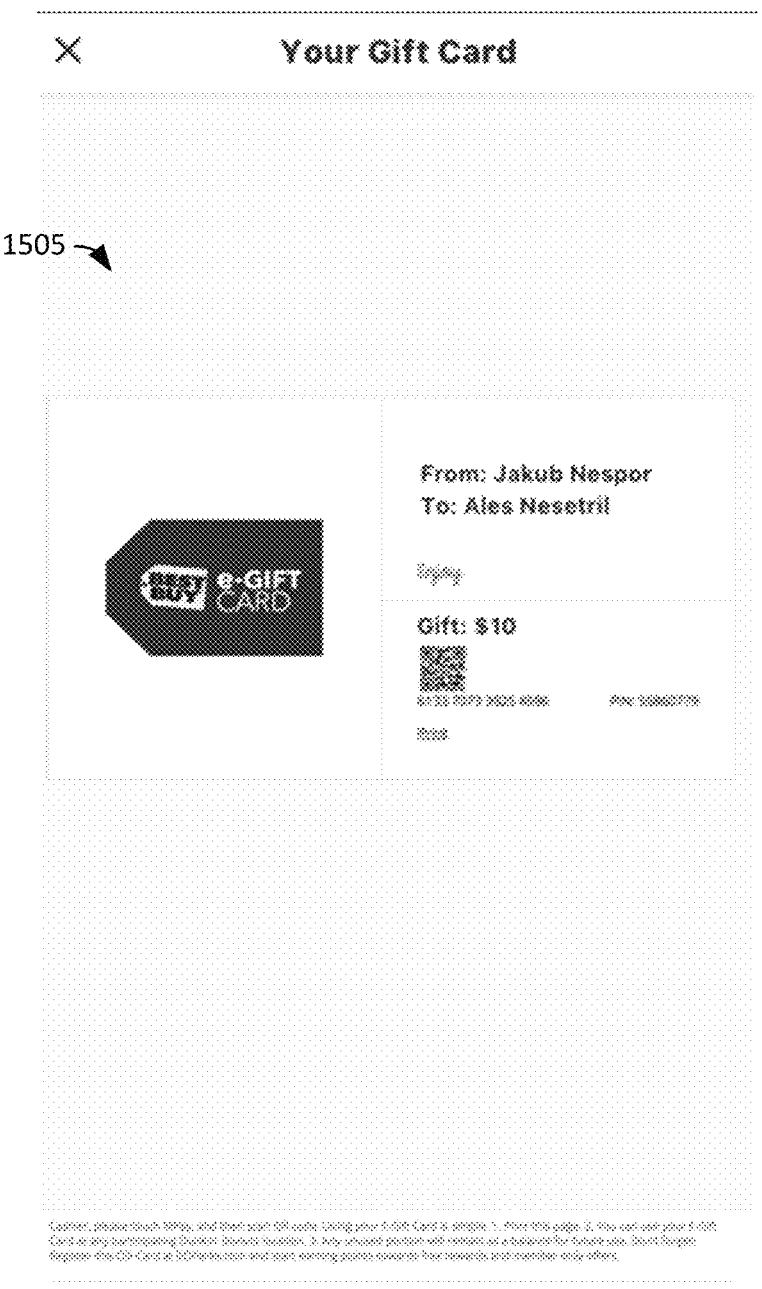

The recipient of the virtual gift card can then spend the virtual gift card at the selected merchant. As depicted in FIG. 15, a view to spend the virtual gift card to purchase goods or services can be generated via view 1505. View 1505 can provide a visual depiction of the virtual gift card, the name of the sender, the name of the recipient, the message, and other attributes such as the monetary value. Moreover, view 1505 can also provide information used by the merchant to validate the monetary amount of the virtual gift card and debit this amount to allow the recipient to spend the virtual gift card. As depicted in FIG. 15, a Quick Response (QR) code can be generated. Additionally, a serial number can also be generated. These can be used by the merchant to quickly and reliably identify the validity of the virtual gift card as well as the monetary value. However, other options can be generated and displayed such as a universal product code (UPC) or other type of identification.

Figure 16:
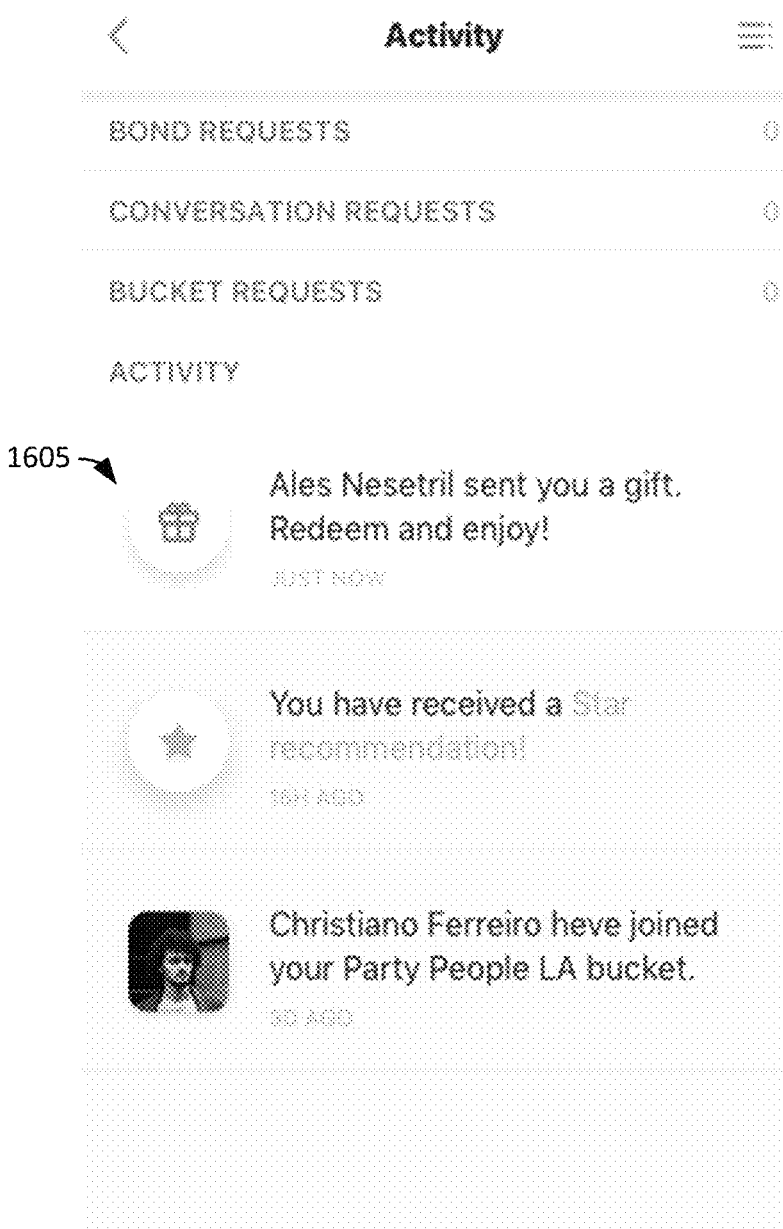

As previously discussed, the application can include many additional functionalities. FIG. 16 shows an example providing a summary of the gifting of virtual gift cards. In FIG. 16, summary message 1605 can provide an alert or recordation of receiving the virtual gift card. In other implementations, the sender can also be provided an alert or recording regarding the gifting of the virtual gift card.

Figure 17:
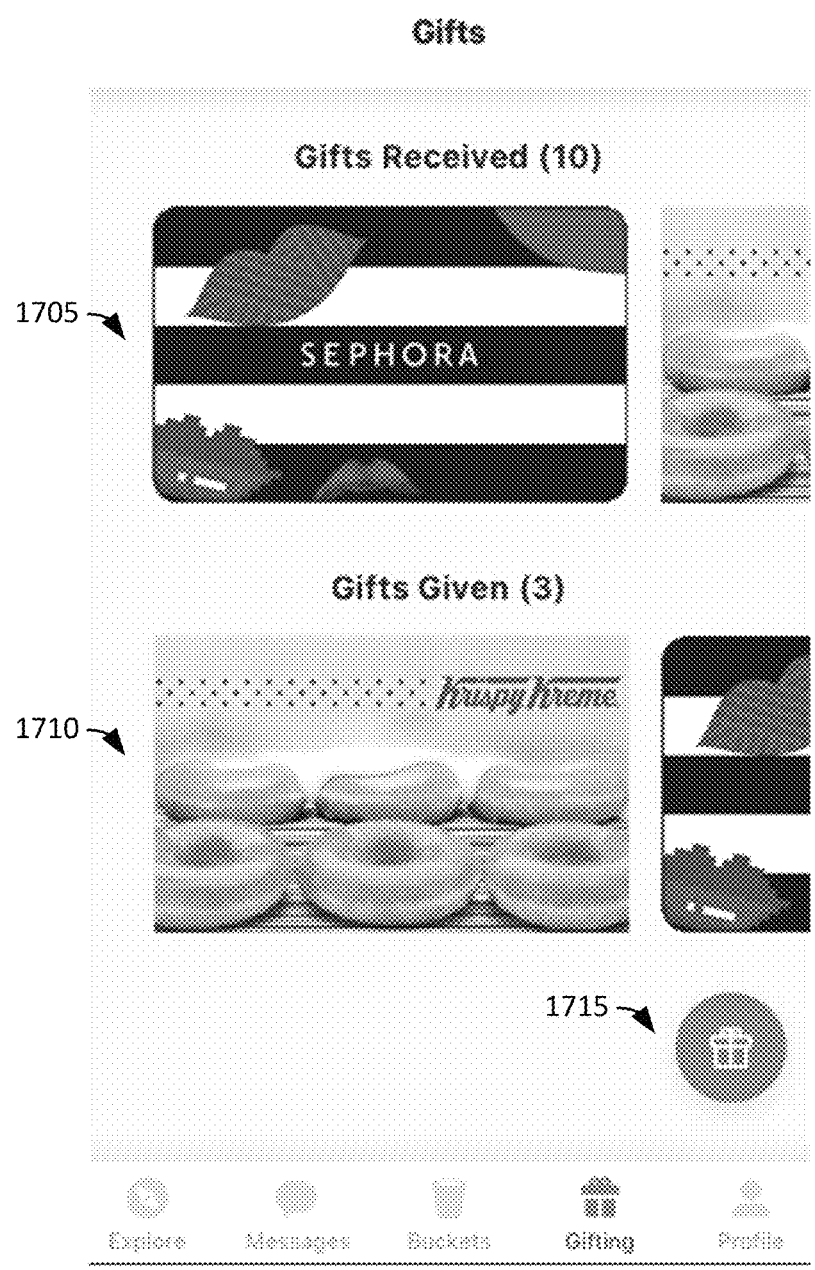

The application can allow for the providing of virtual gift cards via other places other than the messaging system. For example, the application can have a dedicated gifts "tab" or portion of the application in which virtual gift cards can also be provided to a recipient. That is, other parts or GUI elements of the application can also be used to facilitate gifting. In FIG. 17, gifts received 1705 can provide a sequence of received virtual gift cards that can be scrolled through. Selecting one of these gift cards can visually display information regarding the virtual gift card's attributes and information as previously described. Gifts given 1710 shows another horizontal sequence of gift cards that have been provided to others. By selecting gift indicator 1715, providing of a virtual gift card can be initiated, similar to the aforementioned examples.

In some implementations, the depictions of virtual gift cards represented in gifts received 1705 and gifts given 1710 can be emphasized differently if the virtual gift cards have been used. For example, the funds of the virtual gift card can be determined to have been depleted and, therefore, the virtual gift card can be removed (e.g., deleted) from the list. In another example, if a virtual gift card has been at least partially used such that the funds have not been fully depleted, then the visual depiction can be emphasized differently than if a virtual gift card is still at its original funds state (i.e., unused). For example, partially depleted depictions can be displayed in black-and-white rather than color, displayed with different color information (e.g., displayed with lower color intensities, brightness, etc.). As a result, someone can easily determine whether the virtual gift cards that have been given to others have been used. If the virtual gift cards have been used, then the sender can be motivated to provide more virtual gift cards.

The depiction of the virtual gift cards in FIG. 17 can be a "wallet" within the application for gift cards. However, in some implementations, the virtual gift cards can be added to a wallet of an operating system in which the application is running. For example, some mobile device operating systems include an operating system wallet that can be used to store information related to credit cards, tickets, and other items. In some implementations, the virtual gift cards within the application can also be added to this operating system wallet.

Figure 18:
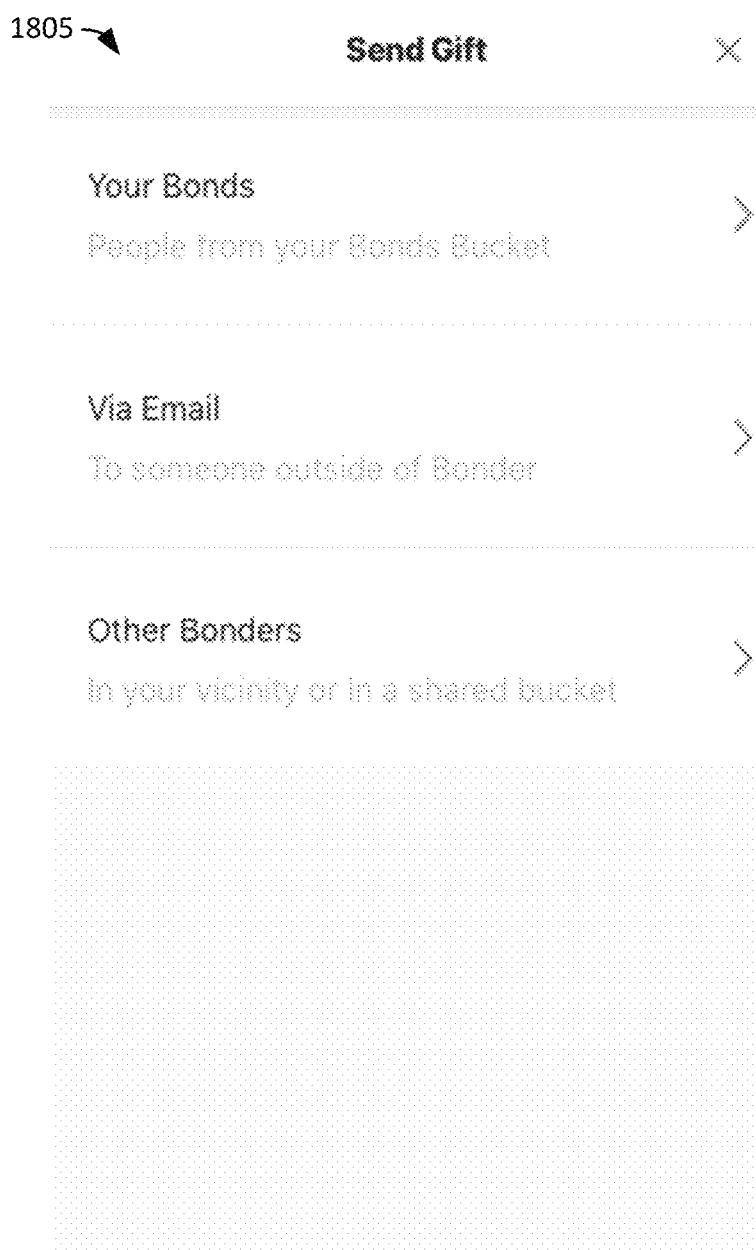
Figure 19:
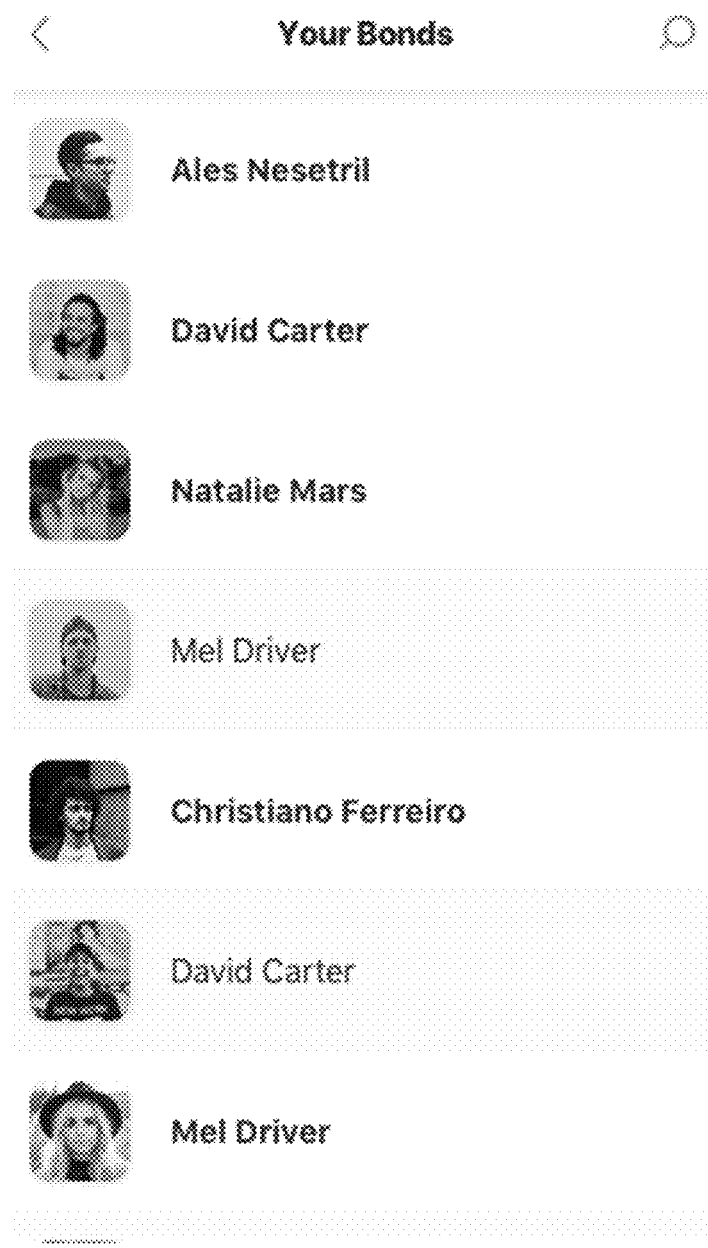

FIG. 18 shows a depiction of selecting how to provide a virtual gift card. For example, in FIG. 18, a virtual gift card can be provided via email or to another user of the application that can be in a bucket, or group, with other users, or a user that is within a geographical proximity of the sender using GUI 1805. As depicted in FIG. 19, another user of the application can be selected to be provided a virtual gift card.

Figure 20:
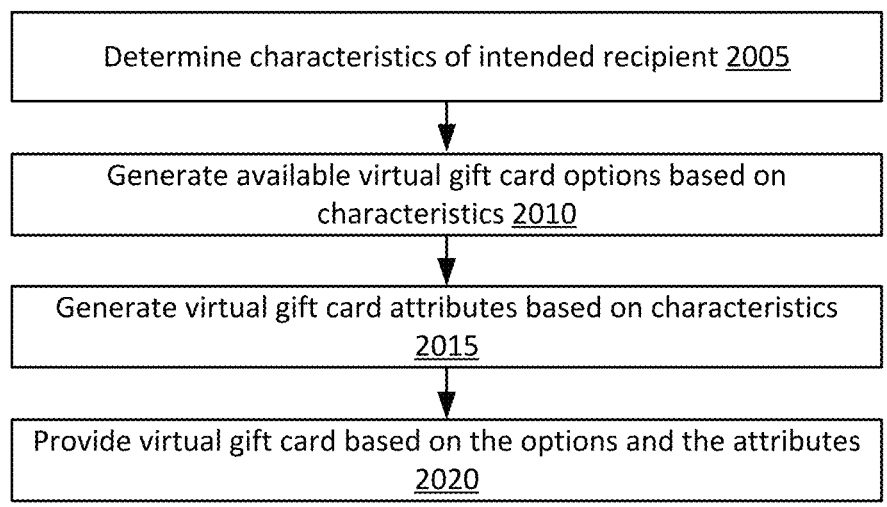
FIG. 20 illustrates a block diagram for generating options for a virtual gift card.

FIG. 20 illustrates a block diagram for generating options for a virtual gift card. In FIG. 20, characteristics of an intended recipient can be determined (2005). For example, the characteristics of a recipient of a virtual gift card can include location, smartphone characteristics, etc. as previously discussed. Next, available gift card options can be generated based on the characteristics (2010). For example, in FIG. 9, a visual display of the various virtual gift cards can be displayed. Virtual gift card attributes can also be generated based on the characteristics (2015). For example, the monetary value can be based on the examples of characteristics described herein. The virtual gift card based on the options and characteristics can then be provided (2020). For example, the data can be sent to a server that can allocate the various funds and gift card information for the recipient.

In some implementations, summary message 1605 in FIG. 16 can also provide trending topics in a large venue. For example, if many users of the application are in a stadium, convention center, etc. many conversations might be going on. Trending topics from these conversations can be determined and provided as an activity alert.

Figure 6:
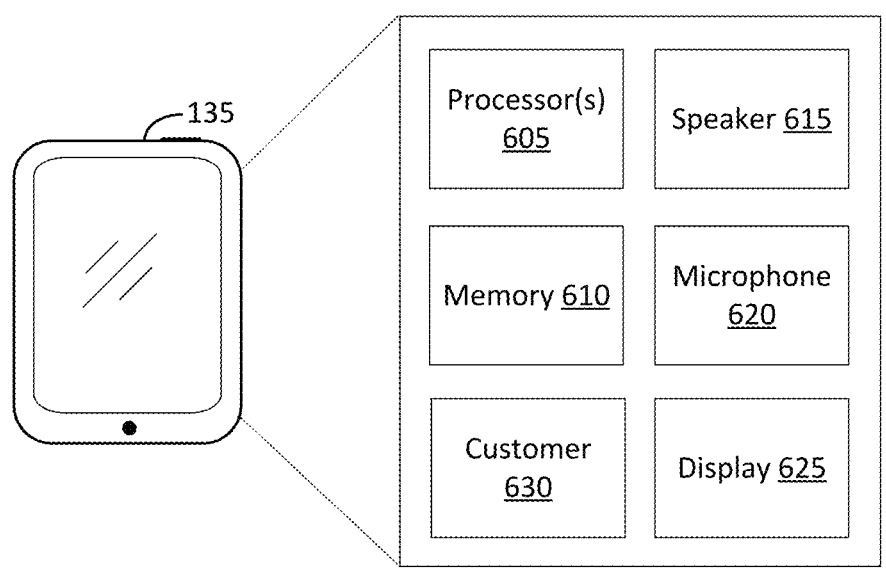
FIG. 6 illustrates an example of a device for facilitating conversations.

FIG. 6 illustrates an example of a device for facilitating conversations. In FIG. 6, assistant device 105 includes a processor 605, memory 610, touchscreen display 625, speaker 615, microphone 635, as well as other types of hardware such as non-volatile memory, an interface device, camera, radios, etc. to implement customer management logic 630 providing the techniques disclosed herein. For example, customer management logic 630 can implement a variety of modules, units, components, logic, etc. implemented via circuitry and other hardware and software to provide a customer interaction logic (e.g., to determine similarities, etc. between customers), customer engagement logic (e.g., to connect customers, perform purchases, etc.), etc. Various common components (e.g., cache memory) are omitted for illustrative simplicity. The assistant device is intended to illustrate a hardware device on which any of the components described in the example of FIGS. 1-5 (and any other components described in this specification) can be implemented. The components of the assistant device can be coupled together via a bus or through some other known or convenient device.

The processor 605 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 605 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method comprising:
    exchanging, by a processor, first text messages between a first participant and a second participant within a messaging system;
    determining, by the processor, that the first participant intends to provide the second participant a virtual gift card from within the messaging system;
    determining, by the processor, a location of the second participant;
    generating, by the processor, a sequence of graphical depictions of virtual gift cards that can be provided to the second participant, the sequence based on the location of the second participant, the sequence of graphical depictions of virtual gift cards including a first visual gift card depiction and a second visual gift card depiction, the first visual gift card depiction being representative of a store location that is closer in distance to the location of the second participant than a store location that is representative of the second visual gift card;
    receiving, by the processor, a selection of a first virtual gift card from the sequence of the graphical depictions of virtual gift cards;
    receiving, by the processor, a selection of attributes for the first virtual gift card, the selection of attributes including a monetary value of the first virtual gift card;
    providing, by the processor, the first virtual gift card to the second participant; and
    generating, by the processor, a content item within the messaging system indicating that the first participant provided the first virtual gift card to the second participant.

2. The method of claim 1, the first visual gift card depiction arranged in the sequence before the second visual gift card depiction.

3. The method of claim 1, further comprising:
    receiving second text messages between the first participant and the second participant, the content item disposed between the first text messages and the second text messages.

4. The method of claim 1, wherein the content item includes a visual depiction of the first virtual gift card.

5. The method of claim 1, wherein the attributes for the first virtual gift card are also based on the characteristics regarding the second participant.

6. The method of claim 1, further comprising:
    determining characteristics of the first text messages, wherein one or both of the sequence or the attributes are based on the characteristics of the first text messages.

7. A system comprising: a processor; and memory storing instructions that, when executed by the processor, cause the system to:
    exchange first text messages between a first participant and a second participant within a messaging system;
    determine that the first participant intends to provide the second participant a virtual gift card from within the messaging system;
    determine a location of the second participant;
    generate a sequence of graphical depictions of virtual gift cards that can be provided to the second participant, the sequence based on the location of the second participant, the sequence of graphical depictions of virtual gift cards including a first visual gift card depiction and a second visual gift card depiction, the first visual gift card depiction being representative of a store location that is closer in distance to the location of the second participant than a store location that is representative of the second visual gift card;
    receive a selection of a first virtual gift card from the sequence of the graphical depictions of virtual gift cards;
    receive a selection of attributes for the first virtual gift card, the selection of attributes including a monetary value of the first virtual gift card;
    provide the first virtual gift card to the second participant; and
    generate a content item within the messaging system indicating that the first participant provided the first virtual gift card to the second participant.

8. The system of claim 7, the first visual gift card depiction arranged in the sequence before the second visual gift card depiction.

9. The system of claim 7, wherein the instructions, when executed by the processor, cause the system to:
    receive second text messages between the first participant and the second participant, the content item disposed between the first text messages and the second text messages.

10. The system of claim 7, wherein the content item includes a visual depiction of the first virtual gift card.

11. The system of claim 7, wherein the attributes for the first virtual gift card are also based on the characteristics regarding the second participant.

12. The system of claim 7, wherein the instructions, when executed by the processor, cause the system to:
    determine characteristics of the first text messages, wherein one or both of the sequence or the attributes are based on the characteristics of the first text messages.

13. A computer program product comprising a non-transitory computer readable medium having computer program instructions stored therein, execution of which by one or more computing devices causes the one or more computing devices to:
    exchange first text messages between a first participant and a second participant within a messaging system;
    determine that the first participant intends to provide the second participant a virtual gift card from within the messaging system;
    determine a location of the second participant;
    generate a sequence of graphical depictions of virtual gift cards that can be provided to the second participant, the sequence based on the location of the second participant, the sequence of graphical depictions of virtual gift cards including a first visual gift card depiction and a second visual gift card depiction, the first visual gift card depiction being representative of a store location that is closer in distance to the location of the second participant than a store location that is representative of the second visual gift card;
    receive a selection of a first virtual gift card from the sequence of the graphical depictions of virtual gift cards;
    receive a selection of attributes for the first virtual gift card, the selection of attributes including a monetary value of the first virtual gift card;
    provide the first virtual gift card to the second participant; and
    generate a content item within the messaging system indicating that the first participant provided the first virtual gift card to the second participant.

14. The computer program product of claim 13, the first visual gift card depiction arranged in the sequence before the second visual gift card depiction.

15. The computer program product of claim 13, having computer program instructions execution of which by one or more computing devices causes the one or more computing devices to:
   receive second text messages between the first participant and the second participant, the content item disposed between the first text messages and the second text messages.

16. The computer program product of claim 13, wherein the content item includes a visual depiction of the first virtual gift card.

17. The computer program product of claim 13, wherein the attributes for the first virtual gift card are also based on the characteristics regarding the second participant.

\* \* \* \* \*